April 25, 1967  H. G. ROGERS  3,316,090
PHOTOGRAPHIC PRODUCT AND PROCESS
Filed July 8, 1963

INVENTOR.
Howard G. Rogers
BY Brown and McKulka
and Alvin Isaacs
ATTORNEYS

United States Patent Office 3,316,090
Patented Apr. 25, 1967

3,316,090
PHOTOGRAPHIC PRODUCT AND PROCESS
Howard G. Rogers, Weston, Mass., assignor to Polaroid Corporation, Cambridge, Mass., a corporation of Delaware
Filed July 8, 1963, Ser. No. 293,449
8 Claims. (Cl. 96—29)

This invention relates to photography and more particularly to novel film units and processes for preparing monochromatic or multicolor images.

One object of this invention therefore is to provide novel film units and processes for preparing color images.

Another object is to prepare color images which may be viewed as a transparency or as a reflection print.

A further object is to provide a novel image-receiving element useful in diffusion transfer processes to obtain a monochromatic or a multicolor image which may be viewed either by reflected or by transmitted light.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein.

Generally speaking, photographic images, including radiographs, may be classified as being either reflection prints or transparencies. Reflection prints ordinarily have a substantially opaque backing and are viewed by reflected or incident light; whereas transparencies have a substantially transparent backing and are viewed by transmitted light, e.g., by light passing through the transparent or non-image areas of the print. Each of the foregoing types of photographic images affords advantages to the viewer not ordinarily obtainable by the other. For example, generally speaking, reflection prints are more convenient since they do not require special sources of light and/or positioning of the print in front of a suitable light source (as would be true of transparencies). Transparencies on the other hand generally afford greater detail to the viewer due to the greater brilliance and longer scale obtainable when viewing by transmitted light.

From the foregoing brief discussion, it should be apparent that it would be extremely desirable to obtain a single color image which is neither a reflection print alone nor a transparency alone, but may be viewed either as a reflection print or as a transparency, thereby combining the advantages of both in a single photograph.

It has been found that such images may be obtained by providing a translucent backing for the color-containing layer. This backing may be accomplished by employing a translucent support material or a layer of a translucent material on a transparent support. A translucent backing of the foregoing description will both reflect and transmit light, so that the image may be viewed either as a reflection print or as a transparency.

However, certain problems inherently exist in the preparation of such color images which are of comparable quality regardless of the source of viewing light.

It is well known that transparencies ordinarily require two or three times the dye density as do reflection prints in order to achieve a color image of comparable quality. Thus, a single color image of the proper dye density to provide a good reflection print would not provide an equally acceptable transparency. On the other hand, if the amount of dye present is adjusted to provide a satisfactory transparency, the quality of the reflection print is adversely affected, since the increased dye density also increases the contrast or slope of the density curve.

It has now been found that these inherent problems may be obviated by providing a print-receptive element comprising a transparent base or support for a pair of color image-receiving layers having a permeable layer of a translucent material therebetween. The print-receptive element of this invention may be more readily understood by reference to FIGURE 1 of the illustrative drawing.

Figure 1:
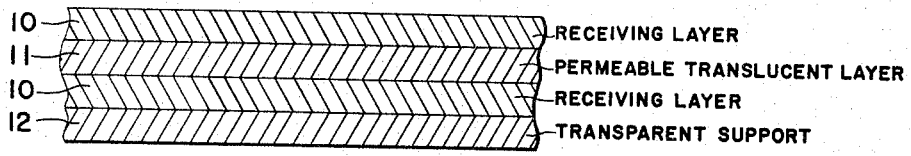
FIGURE 1 is a diagrammatic, enlarged, cross-sectional view illustrating the image-receiving element of this invention.

As shown in FIGURE 1, the print-receptive element of this invention comprises a transparent support 12 containing a pair of color image-receiving layers 10 and 10a separated by a layer of a permeable translucent material 11.

Layers 10 and 10a which may be the same or different, comprise layers on which or in which a color image may be formed. In photographic systems wherein the color image-providing material is a dye, layers 10 and 10a are dye-receptive layers which preferably contain a mordant for fixing or otherwise retaining the dye image. As will be more apparent hereinafter, layers 10 and 10a may contain other ingredients necessary for forming the color image.

Permeable translucent layer 11 comprises a layer of a suitable translucent material which is permeable to the processing solution and to image-forming components used in forming the images in layers 10 and 10a. Translucent materials of this nature are well known in the art and per se comprise no part of the present invention. By way of illustration, layer 11 may comprise a dispersion of titanium dioxide in gelatin. If desired or found expedient to do so, a small amount of a wetting agent may also be employed.

Transparent support 12 may be a plastic such as a cellulosic ester, e.g., cellulose acetate, a synthetic superpolymer of the nylon type or any of the other transparent base materials heretofore known in the art.

The thickness of the various layers is not critical and will be apparent to those skilled in the art.

Figure 3:
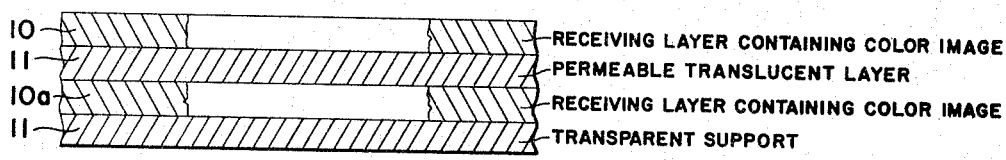
FIG. 3 is a diagrammatic, enlarged, cross-sectional view of the visible image obtained by the present invention.

As shown in FIG. 3, when the print-receptive element of FIGURE 1 is processed in a manner to be described with more particularity hereinafter, a color image is formed in each of the two receiving layers. In viewing a color image such as is illustrated in FIG. 3 by reflected light, only one of the color-receiving layers containing the color image is visible and the dye density of the viewed image is the dye density of the particular layer 10 or 10a viewed. On the other hand, when viewed as a transparency, the dye density of the transparency is determined by the dye densities on the two color image-receiving layers. Thus, a single color image may be obtained which is of greater density when viewed as a transparency than when viewed as a reflection print. This in turn provides a single image of excellent quality regardless of the source of viewing light.

The print-receptive element of this invention may be used in various photographic processes for preparing color images. In a preferred embodiment, however, use is made of the diffusion transfer processes described and claimed in U.S. Patent No. 2,983,606 issued to Howard G. Rogers. As disclosed in said patent, a photographic element comprising at least one silver halide emulsion is exposed and subsequently developed in the presence of a dye developer, e.g., a compound which is both a dye and a silver halide developing agent, to impart to an image-receiving layer a reversed or positive dye image of the developed image by permeating into the emulsion a suitable liquid processing composition and bringing the emulsion into superposed relationship with an appropriate image-receiving layer. Preferably, the dye developer is contained initially as a layer in the photosensitive element, although it may be present in the liquid processing composition. The liquid processing composition permeates the emulsion to provide a solution of dye developer substantially uniformally distributed therein. As the exposed silver halide emulsion is developed, the oxidation product of the dye developer is immobilized or precipitated in situ with the developed silver, thereby providing an imagewise distribution of unoxidized dye developer dissolved in the liquid processing composition. At least part of this imagewise distribution of unoxidized dye developer is transferred, by imbibition, to the superposed image-receiving layer. This image-receiving layer, which may contain agents adapted to mordant or otherwise fix the diffused, unoxidized dye developer, receives a depthwise diffusion from the emulsion of unoxidized dye developer without appreciably disturbing the imagewise distribution thereof, to provide a reversed or positive color image of the developed or negative image. The desired positive image may then be revealed by separating the image-receiving layer from the photosensitive element at the end of the imbibition. As disclosed in the patent, a single silver halide emulsion and associated dye developer may be employed to provide a monochromatic image, or more than one such emulsion and associated dye developer may be employed to prepare multicolor images.

As was indicated heretofore, the present invention is particularly adapted to the preparation of color images by diffusion transfer processes employing dye developers as the color-providing material. This aspect of the invention will be more fully understood by reference to FIG. 2 of the accompanying drawing.

Figure 2:
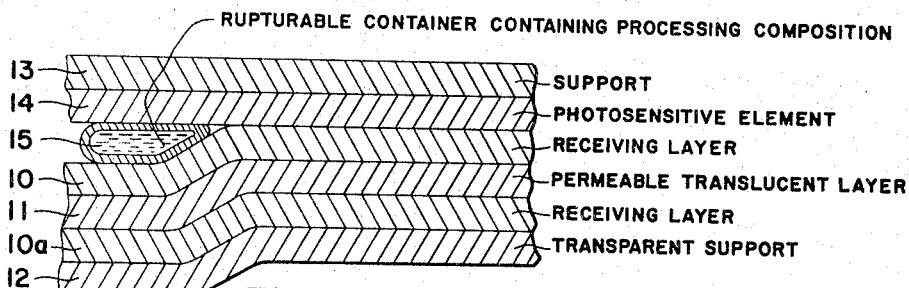
FIG. 2 is a similar view illustrating the application of this invention to diffusion transfer processes for preparing color images.

As shown in FIG. 2, an exposed photosensitive element 14 on a support 13 is shown to be in superposed relationship with the print-receptive element. The photosensitive element contains at least a silver halide emulsion. While it is shown diagrammatically as comprising a single layer, it will be appreciated that it may contain more than one layer. As noted heretofore, a layer of dye developer may be present in the photosensitive element, e.g., in or behind the silver halide emulsion. Where a multi-color image is desired, photosensitive element 14 may contain more than one silver halide emulsion and associated dye developer. For example, as is disclosed in aforementioned U.S. Patent No. 2,983,606, the photosensitive element may contain a blue-sensitive silver halide emulsion and associated yellow dye developer, a green-sensitive silver halide emulsion and associated magenta dye developer, and a red-sensitive silver halide emulsion and associated cyan dye developer.

In known manner, the development of the photosensitive element is accomplished by spreading an aqueous alkaline processing composition between the exposed element and a superposed print-receptive element. Preferably, the processing composition is confined in a rupturable or frangible container 15 positioned between the photosensitive element and the print-receptive element, in which case development is initiated by rupturing container 15, e.g., by means of a pair of pressure rollers, and spreading of its contents in a substantially uniform layer between photo-sensitive element 14 and the adjacent receiving layer 10 of the print-receptive element.

In this embodiment of the invention, receiving layers 10 and 10a which may be the same or different, may be any of the dye-receptive layers heretofore known in the art. As examples of useful image-receiving materials, mention may be made of nylon, e.g., N-methoxymethyl-polyhexamethylene adipamide, polyvinyl alcohol and gelatin, particularly polyvinyl alcohol or gelatin containing a dye mordant such as poly-4-vinylpyridine.

When the processing composition is spread between the exposed photosensitive element and the adjacent receiving layer 10, e.g., by rupturing container 15, an imagewise distribution of unoxidized dye developer is transferred by imbibition to receiving layer 10. At least a portion of this unoxidized dye developer is deposited on or in layer 10 to form a visible dye image, while a second portion passes through layer 10, permeable layer 11 and is deposited on or in layer 10a to form a second dye image. It will be appreciated that the images formed in or on layers 10 and 10a will be substantially identical. In this manner, there is formed a pair of substantially identical dye images separated by a layer of a translucent material, such as is illustrated in FIG. 3.

As will be apparent to those skilled in the art, by controlling the dye receptivity of layers 10 and 10a, e.g., by controlling the amount or effectiveness of one or more mordants present in either or both of the layers, the dye density of the images formed in layers 10 and 10a may be controlled so that the dye densities of the respective images are substantially the same. Alternatively, a dye image of greater density may be formed in one or the other of the receiving layers.

While for purposes of illustration, the practice of the invention in photographic systems utilizing dye developers has been described, it will be appreciated that the invention is not limited thereto, and other photographic processes for preparing color images may also be employed in the practice of this invention. For example, the photographic processes described and claimed in U.S. Patents No. 2,559,643, 2,661,293, 2,698,798, 2,802,735, 2,968,554 issued to Edwin H. Land; 2,774,668, 2,909,430, 3,015,561, 3,087,817 issued to Howard G. Rogers; 2,892,710 issued to Marilyn R. Cohler and Myron S. Simon; and 2,992,105 issued to Richard S. Corley and Milton Green may be employed in the practice of this invention.

Generally speaking, photographic processes such as described in the aforementioned patents involve an oxidation and/or coupling reaction to provide the desired color image. In utilizing the present invention in the patented processes, it will be appreciated that the color print-receptive element of the present invention may contain the necessary ingredients, e.g., coupling components, oxidizing agents, etc. to form the color image. These ingredients may be present in layers 10 and 10a or may be in separate layers contiguous to layers 10 and 10a.

Accordingly, as used herein and in the appended claims, the term "color image-receiving layer" connotes a layer having the necessary ingredients, e.g., dye mordant, coupling components, oxidizing agents, etc. (depending upon the photographic system employed) for receiving and/or forming a color image.

It is therefore to be understood that the particular color image-receiving layers employed in the practice of this invention are per se known in the art and the selection of the particular receiving layers will in turn depend upon the particular photographic system employed. Representative systems are described in the aforementioned patents, although others may be readily suggested to those skilled in the art. Accordingly, the essence of the invention is the provision of a print-receptive element comprising a pair of permeable receiving layers having a layer of a permeable translucent material therebetween so that a pair of substantially identical images may be formed thereon, thereby providing a color print which may be viewed either as a transparency or as a reflection print. In other words, the essence of the invention is the novel arrangement of the elements, the particular structure of each element being well known in the art.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A novel photographic product comprising a first and a second color image-receiving layer, each of said layers being adapted to receive an imagewise distribution of color image-forming constituents from a liquid medium containing the same; and a layer of a translucent material positioned between said two color image-receiving layers, said layers being in substantially parallel relationship with one another, said layer of translucent material being permeable to said liquid medium containing said color image-forming constituents whereby to permit diffusion of said liquid medium through one of said color image-receiving layers and said translucent layer to the other of said color image-receiving layers.

2. A novel print-receptive element for use in diffusion transfer processes for preparing dye images, comprising a transparent support having on one side thereof, in order, a first layer for forming a dye image, a layer of a translucent material, and a second layer for forming a dye image, said second layer for forming a dye image and said layer of translucent material being permeable to a dye-containing liquid medium, whereby to permit a depthwise diffusion of said liquid medium through said second layer and said translucent layer to said first layer to impart to each of said first and second layers, as a function of said diffusion, a dye image.

3. A print-receptive element as defined in claim 2 wherein at least one of said layers for forming a dye image contains a dye mordant.

4. An element as defined in claim 3 wherein each of said layers contains a dye mordant, the amount and effectiveness of the mordants in said layers being such as to permit obtaining in said two layers, images having substantially the same dye densities.

5. A process of preparing a photographic image in color which is both a reflection print and a transparency which comprises the steps of developing an exposed photosensitive element containing a developable image; forming an imagewise distribution of color image-forming constituents as a product of said development; transferring said imagewise distribution, by imbibition, to a print-receptive element comprising a first and a second color image-receiving means having a layer of a permeable translucent material positioned therebetween to format said first color image-receiving means a first color image in terms of a first portion of said imagewise distribution of color image-forming constituents; and diffusing depthwise a second portion of said imagewise distribution through said first color image-receiving means and said permeable translucent material to said second color image-receiving means to form thereat a second color image, said first and second color images being substantially identical in terms of color and subject matter.

6. A process as defined in claim 5 wherein said color images are dye images.

7. A process as defined in claim 6 wherein the dye densities of said images are substantially the same.

8. A process for preparing a photographic image in color which is both a reflection print and a transparency which comprises the steps of:

(1) developing an exposed photosensitive element including at least one light-sensitive silver halide emulsion containing a developable image with an aqueous alkaline processing composition in the presence of an associated dye developer, said dye developer being a compound which is both a dye and a silver halide developing agent, whereby said dye developer is oxidized as a function of development to provide an oxidation product which is substantially less mobile in said processing composition than is unoxidized dye developer;

(2) forming, as a function of said development, an imagewise distribution of unoxidized dye developer;

(3) transferring, by imbibition, said imagewise distribution of unoxidized dye developer to a superposed print-receptive element comprising a first and a second dyeable layer separated by a layer of a permeable translucent material;

(4) depositing a first portion of said imagewise distribution of unoxidized dye developer at said first dyeable layer to form a first positive dye transfer image;

(5) diffusing depthwise a second portion of said imagewise distribution of unoxidized dye developer through said first dyeable layer and said layer of permeable material to said second dyeable layer; and (6) depositing said second portion of unoxidized dye developer at said second dyeable layer to form a second positive dye transfer image, said first and second dye transfer images being substantially identical in terms of color and subject matter, thereby forming a color print comprising a pair of substantially identical dye images possessing the same or different dye densities separated by a layer of translucent material, said color print being viewable by both reflected and transmitted light.

References Cited by the Examiner

UNITED STATES PATENTS

| 3,114,833 | 12/1963 | Fine | 96—2 |
| 3,163,554 | 12/1964 | Gessler | 96—2 |
| 3,185,841 | 5/1965 | Land | 96—76 |

NORMAN G. TORCHIN, *Primary Examiner.*

J. T. BROWN, *Assistant Examiner.*